(12) United States Patent
Bergsma (10) Patent No.: US 10,891,019 B2
(45) Date of Patent: Jan. 12, 2021

(54) DYNAMIC THUMBNAIL SELECTION FOR SEARCH RESULTS

(71) Applicant: Huawei Technologies Co., Ltd., Shenzhen (CN)

(72) Inventor: Shane Anthony Bergsma, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 15/056,491

(22) Filed: Feb. 29, 2016

(65) Prior Publication Data

US 2017/0249367 A1   Aug. 31, 2017

(51) Int. Cl.
*G06F 3/0482* (2013.01)
*G06F 16/583* (2019.01)
*G06F 16/951* (2019.01)
*G06F 16/54* (2019.01)

(52) U.S. Cl.
CPC ............ *G06F 3/0482* (2013.01); *G06F 16/54* (2019.01); *G06F 16/583* (2019.01); *G06F 16/951* (2019.01)

(58) Field of Classification Search
CPC .......... G06F 17/30554; G06F 3/04817; G06F 3/0482; G06F 17/30268; G06F 17/3053; G06F 17/3084
USPC ........................................................ 707/730
See application file for complete search history.

(56) References Cited

U.S. PATENT DOCUMENTS 8,429,173 B1 * 4/2013 Rosenberg ............. G06F 16/14
707/748
8,909,625 B1 * 12/2014 Stewenius ............... G06F 16/54
707/723
9,208,548 B1 * 12/2015 Noble ................. G06F 16/5866
9,875,284 B1 * 1/2018 Amacker .......... G06F 16/24578
2002/0168117 A1 11/2002 Lee et al.
(Continued)

FOREIGN PATENT DOCUMENTS

CN       1378159 A       11/2002
CN      101308504        11/2008
(Continued)

OTHER PUBLICATIONS

International Search Report, dated Mar. 9, 2017, 4 pages, Application No. PCT/CN2017/073501.
(Continued)

*Primary Examiner* — Ashish Thomas
*Assistant Examiner* — Abdullah A Daud
(74) *Attorney, Agent, or Firm* — Slater Matsil, LLP (57) ABSTRACT

The present disclosure is drawn to methods and systems for providing a representative image for a search result in a search result listing of a searching system. At least one search result based on a search query is received. Each search result has a plurality of images. For each search result, a similarity score for at least some of the images is computed, based on a similarity with the search query. Then, at least one of the images is selected, on the basis of the similarity score, and the selected image is assigned as the representative image of the search result. A number of modification steps may be performed on the search result prior to computing the similarity score. The search result and assigned representative image may also be presented in a search result listing.

19 Claims, 7 Drawing Sheets

(56) References Cited

U.S. PATENT DOCUMENTS

| | | | |
|---|---|---|---|
| 2004/0189691 A1* | 9/2004 | Jojic | G06F 16/745 715/720 |
| 2005/0234324 A1* | 10/2005 | Sugimoto | G06K 9/3208 600/407 |
| 2006/0071942 A1* | 4/2006 | Ubillos | G06T 11/00 345/619 |
| 2007/0077025 A1* | 4/2007 | Mino | G06F 16/5838 386/241 |
| 2007/0174872 A1 | 7/2007 | Jing et al. | |
| 2007/0201729 A1* | 8/2007 | Yuasa | G06K 9/6211 382/118 |
| 2009/0041430 A1* | 2/2009 | Ishizaka | H04N 21/43622 386/326 |
| 2010/0100457 A1* | 4/2010 | Rathod | G06Q 30/0623 705/26.1 |
| 2010/0322534 A1* | 12/2010 | Bolme | G06K 9/746 382/278 |
| 2011/0047163 A1* | 2/2011 | Chechik | G06F 16/783 707/741 |
| 2011/0170769 A1* | 7/2011 | Sakimura | G06K 9/623 382/159 |
| 2014/0297476 A1 | 10/2014 | Wang et al. | |
| 2015/0085114 A1 | 3/2015 | Ptitsyn | |
| 2015/0100561 A1* | 4/2015 | Li | G06F 16/2425 707/706 |
| 2015/0169708 A1 | 6/2015 | Song et al. | |
| 2015/0185017 A1* | 7/2015 | Kreider | G06T 3/0006 382/165 |
| 2015/0356129 A1 | 12/2015 | Liu | |
| 2015/0370833 A1* | 12/2015 | Fey | G06F 16/532 707/767 |
| 2016/0005177 A1* | 1/2016 | Fujita | G06T 19/20 345/420 |
| 2016/0034809 A1* | 2/2016 | Trenholm | G06F 8/35 706/20 |
| 2016/0048298 A1* | 2/2016 | Choi | G06Q 30/0267 715/846 |
| 2016/0111047 A1* | 4/2016 | Yamato | G09G 3/3611 345/102 |
| 2017/0132659 A1* | 5/2017 | Dirks | G06Q 30/0247 |
| 2017/0249339 A1* | 8/2017 | Lester | G06F 16/56 |
| 2017/0304732 A1* | 10/2017 | Velic | G06K 9/6255 |
| 2017/0339374 A1* | 11/2017 | Eyal | H04N 21/8153 |

FOREIGN PATENT DOCUMENTS

| | | | | |
|---|---|---|---|---|
| CN | 101308504 A | * | 11/2008 | ....... G06F 17/30256 |
| CN | 101535945 A | | 9/2009 | |
| CN | 101840420 A | | 9/2010 | |
| CN | 102129451 A | | 7/2011 | |
| CN | 102279864 | | 12/2011 | |
| CN | 102368266 | | 3/2012 | |
| CN | 103020303 A | | 4/2013 | |
| CN | 103064972 | | 4/2013 | |
| CN | 102279864 B | * | 7/2014 | |
| CN | 103970769 A | | 8/2014 | |
| CN | 104077306 A | | 10/2014 | |
| CN | 105243060 | | 1/2016 | |
| CN | 107102694 A | | 8/2017 | |
| EP | 2375350 A1 | | 10/2011 | |
| WO | 2014109127 A1 | | 1/2017 | |

OTHER PUBLICATIONS

Truong et al., "Video-Abstraction: A Systematic Review and Classification", ACM Transactions on Multimedia Computing, Communications and Applications, vol. 3, No. 1, Article 3, Feb. 2007, 37 pages.

Yuk et al., "Object-Based Surveillance Video Retrieval System with Real-Time Indexing Methodology", Proceedings of the 4th International Conference on Image Analysis and Recognition (ICIAR 2007), Montreal, Canada, Aug. 2007, Lecture Notes in Computer Science, 2007, vol. 4633, pp. 626-637.

Liu, S., et al., Research and Application of Similarity Based on Search Engine, Computer Science, vol. 41 No. 4., Apr. 2014, 4 Pages.

* cited by examiner

DYNAMIC THUMBNAIL SELECTION FOR SEARCH RESULTS

TECHNICAL FIELD

The present disclosure is drawn generally to image processing systems, and more specifically to searching systems returning search results for subject matching.

BACKGROUND

Increasingly greater quantities of data are being collected and stored across a host of industries and in a variety of applications. To sort through and find data of interest, search engines have been developed. Such search engines exist not only for finding data in textual form, but also for finding visuals of interest in images and video.

When searching for a visual of interest, a searching system can return search results in response to a search query. Search results may be presented in list form, and may include a "thumbnail" for each search result, a still image taken from the search result and representative of the content of the search result. If thumbnails are not well chosen, the search results are difficult for an operator of the searching system to interpret. For example, a poorly-selected thumbnail may have a subject facing away from a camera, or obscured by another object, such as a passing car.

Therefore, there is a need for systems and methods for presenting video search results with more representative thumbnails.

SUMMARY

The present disclosure is drawn to methods and systems for providing a representative image for a search result in a search result listing of a searching system. At least one search result based on a search query is received. Each search result has a plurality of images. For each search result, a similarity score for at least some of the images is computed, based on a similarity with the search query. Then, at least one of the images is selected, on the basis of the similarity score, and the selected image is assigned as the representative image of the search result. A number of modification steps may be performed on the search result prior to computing the similarity score. The search result and assigned representative image may also be presented in a search result listing.

In accordance with a broad aspect, there is provided a method, comprising: receiving at least one search result based on a search query, the at least one search result comprising a plurality of images; and for each of the at least one search result: computing a similarity score for at least some of the images based on a similarity with the search query; selecting at least one of the images on the basis of the similarity score; and assigning the at least one selected image as a representative image of the search result.

In some embodiments, the method further comprises, for at least one search result, modifying the images of the search result and computing the similarity score on the basis of the images as modified.

In some embodiments, selecting at least one of the images comprises selecting at least one of the images as modified.

In some embodiments, modifying the images of the search result comprises performing at least one of expanding, cropping, rotating, inverting, and color-correcting at least some images of the at least one search result.

In some embodiments, modifying the images is performed on the basis of the search query.

In some embodiments, computing a similarity score comprises comparing the similarity score to a predetermined threshold, and the method further comprises, for at least one search result, modifying the images when the similarity score falls below the threshold, and repeating the computing on the basis of the modified images.

In some embodiments, the method further comprises presenting a search result listing of the at least one search result and the respective assigned representative image.

In some embodiments, presenting a search result listing of the at least one search result comprises ordering the at least one search result at least partly on the basis of the similarity score of the respective representative image.

In some embodiments, assigning the at least one selected image comprises assigning a plurality of selected images as representative images of the search result and cycling through each of the representative images of a particular search result.

In some embodiments, receiving at least one search result comprises receiving at least one video track consisting of the plurality of images, and presenting a search result listing comprises, in response to an interaction with a particular search result, causing playback of the video track associated with the particular search result starting from the representative image.

In some embodiments, the video tracks received as search results each consist of a plurality of images. Each image corresponds to a region of interest extracted as a sub-image from a larger video frame. For example, the video track might be a sequence of images "tracking" a subject-of-interest in a larger video, for example a human or car that is being tracked across frames in a surveillance video via the automatic tracking function of an intelligent video surveillance system. In these embodiments, modifying the images prior to computing similarity could include adjusting the boundary of the sub-images within the larger video, e.g. through translation, expansion, or other operations on the boundaries of the regions of interest.

In accordance with another broad aspect, there is provided a system comprising a processing unit and a memory communicatively coupled to the processing unit and comprising computer-readable program instructions executable by the processing unit. The computer-readable program instructions are executable by the processing unit for: receiving at least one search result based on a search query, the at least one search result comprising a plurality of images; and for each of the at least one search result: computing a similarity score for at least some of the images based on a similarity with the search query; selecting at least one of the images on the basis of the similarity score; and assigning the at least one selected image as a representative image of the search result.

In some embodiments, the program instructions are further executable by the processing unit for: modifying the images of the search result; and computing the similarity score on the basis of the images as modified; for at least one search result In some embodiments, selecting at least one of the images comprises selecting at least one of the images as modified In some embodiments, modifying the images of the search result comprises performing at least one of expanding, cropping, rotating, inverting, and color-correcting at least some images of the at least one search result.

In some embodiments, modifying the images is performed on the basis of the search query.

In some embodiments, computing a similarity score comprises comparing the similarity scores to a predetermined threshold, and the program instructions are further executable by the processing unit for: modifying the images when the similarity scores falls below the threshold; and repeating the computing on the basis of the modified images; for at least one search result.

In some embodiments, the program instructions are further executable by the processing unit for presenting a search result listing of the at least one search result and the respective assigned representative image.

In some embodiments, presenting a search result listing of the at least one search result comprises ordering the at least one search result at least partly on the basis of the similarity score of the respective representative image.

In some embodiments, assigning the at least one selected image comprises assigning a plurality of selected images as representative images of the search result, and cycling through each of the representative images of a particular search result.

In some embodiments, receiving at least one search result comprises receiving at least one video track consisting of the plurality of images, and presenting a search result listing comprises, in response to an interaction with a particular search result, causing playback of the video track associated with the particular search result starting from the representative image

DETAILED DESCRIPTION

Figure 1:
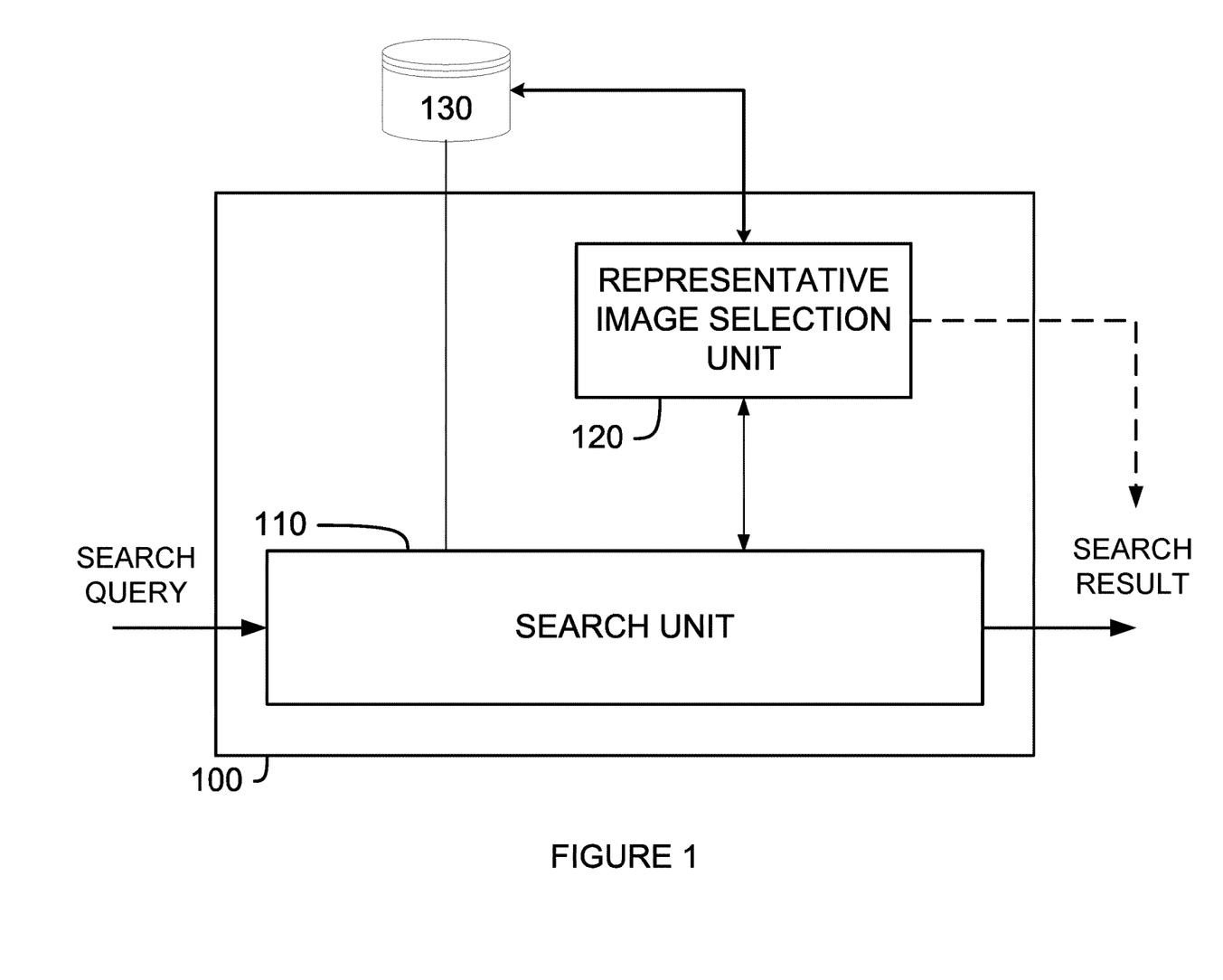
FIG. 1 is a block diagram of a searching system as considered within the scope of the present description.

With reference to FIG. 1, there is illustrated a searching system 100 implemented by a computing device. The computing device is any suitable computer, such as a desktop computer, a laptop computer, a mainframe, a server, a portable computing device, a smartphone, a wearable electronic device, and the like. The searching system 100, upon receiving a search query, searches through a database 130 to find one or more matches. The search query may be a still image, a portion of video, a textual string, or any other suitable search query. The search query may also include information about the type of content to be searched, a date and/or time of video to search, or other search-related parameters. In this example, the searching system 100 comprises a search unit 110 and a representative image selection unit 120.

The search unit 110 is configured for receiving search queries and outputting search results that correspond to the search requests. Search queries may be based on interaction with a user of the searching system 100, or may be automatically generated by the searching system 100 based on predefined rules and algorithms. For example, the search unit 110 periodically generates a search query for a person-like figure, in order to search for any human activity through a repository of security video footage. Other search-related parameters, such as a range of dates and/or times to search, a search resolution, a search framerate, and the like, may also be provided to the search unit 110 as part of the search query.

Any suitable search algorithm may be used by the search unit 110 to match the content of the database 130 with the search query. For example, the searching algorithm might include extracting features from images and then computing a similarity score to determine a match. In some embodiments, a threshold is set for the similarity score, above which the subjects are considered to be a match. A similarity score found to be below the threshold would be indicative of no match. In other embodiments, a greatest similarity score (or smallest distance) obtained from comparing a target image to a plurality of source images is indicative of a match and all other scores are indicative of no match. Feature extraction can be performed using local and/or global features. Local features are spatial, location-specific features, and are obtained, for example, using a scale-invariant feature transform (SIFT) algorithm. Global features are typically robust to changes in orientation and are, for example, color- or texture-based features obtained using a Red, Green, Blue (RGB), Hue, Saturation, Value (H, S, V), or luminance and chrominance (Y, Cb, Cr) color model. In general, image features capture different aspects of the image, such as color, texture, patterns, small image patches, etc.

The search unit 110 provides the search results and the search query to the representative image selection unit 120. For example, the search results and search query are both stored in the database 130, from which they can be retrieved by the representative image selecting unit 120.

Figure 2:
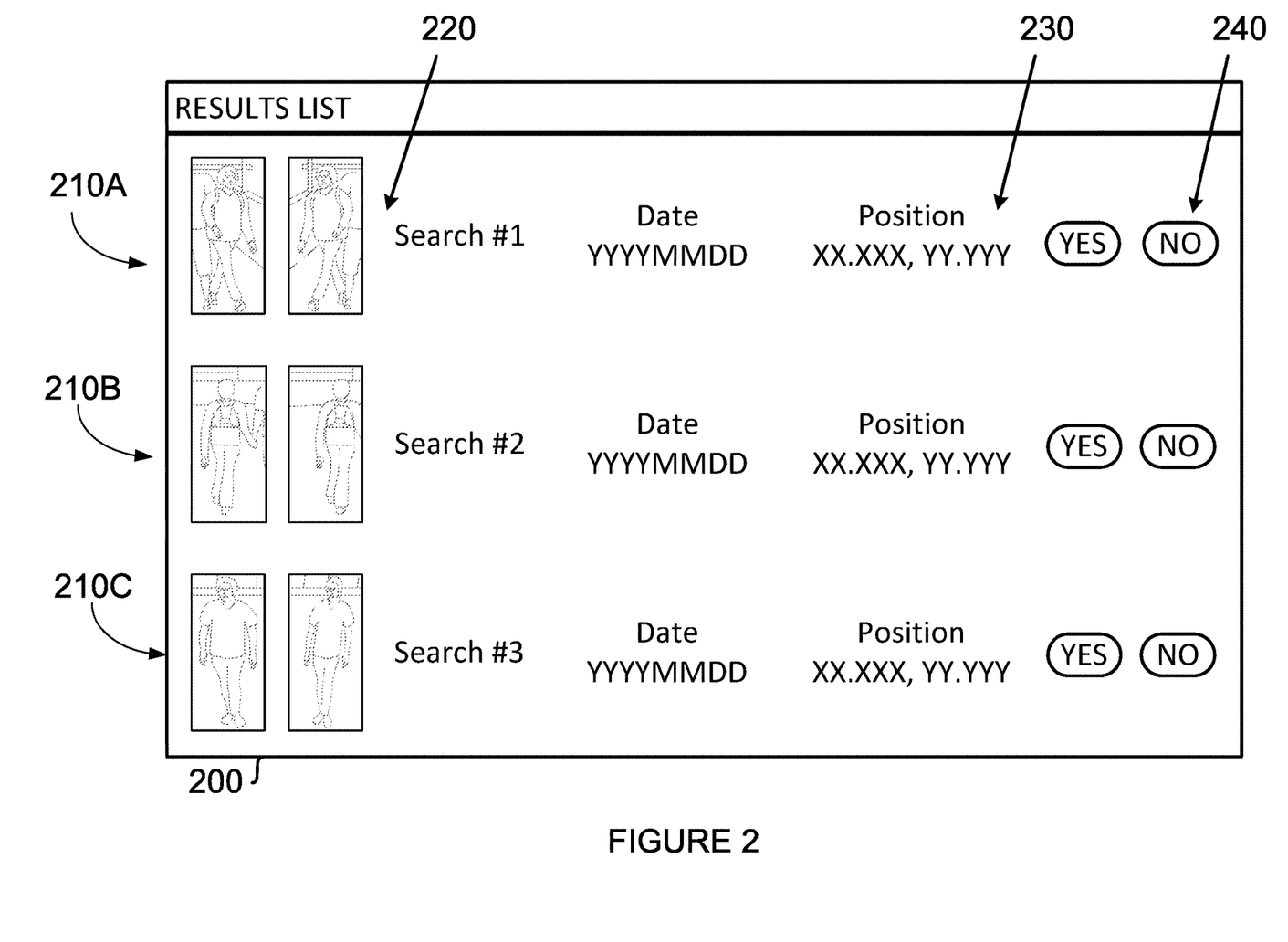
FIG. 2 is an example search result listing with a plurality of search results.

FIG. 2 illustrates an embodiment search result listing for displaying the search results. Three search result entries 210A, 210B, 210C (collectively referred to as 210) in a search result listing 200 represent possible matches. In some embodiments, only a subset of the search results 210 is presented at any given time. The search result entries 210 of FIG. 2 are organized in respective rows, with each entry having one or more representative images 220 associated with the search result. Other search-related information 230 may also be provided.

In some embodiments, the search result listing 200 is interactive. For example, a user can select "yes" or "no" from a pair of interactive graphical display elements 240 in order to retain or discard any of the entries 210 from the search result listing 200. In another example, a user can select any portion of the search result entries 210 to cause playback of an associated video track. Other interactive features may also be provided.

Figure 3:
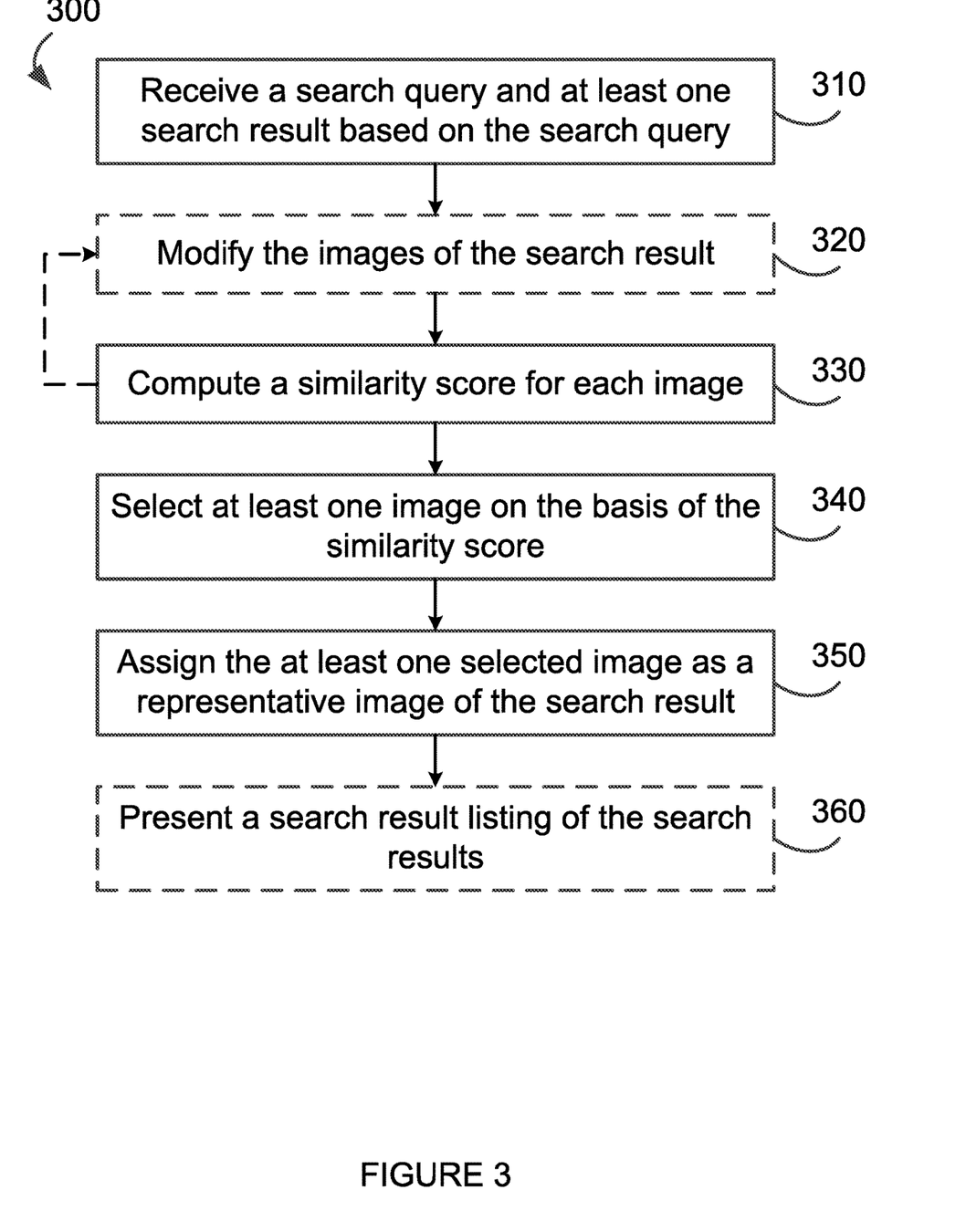
FIG. 3 is a flowchart illustrating an embodiment of a method implemented by a computing device.

The representative images 220 are dynamically selected by the representative image selection unit 120, as illustrated in the method 300 of FIG. 3. At step 310, the representative image selection unit 120 receives a search query and at least one search result based on the search query. The search result and the search query can be received from the search unit 110, the database 130, or from any other source. Other embodiments for receiving the search result and the search query may also be used, such as having them input to the representative image selection unit 120 from another source. In some embodiments, receiving the image selection 120 corresponds to fetching or otherwise acquiring the search query and the at least one search result from the search unit 110, the database 130, or from any other source.

The search query, as described above, includes one or more still images, one or more portions of video, one or more textual strings, or any suitable combination thereof. In some embodiments, the search query includes a textual string containing keywords. The search unit 110 is configured for interpreting the keywords to determine a reference image, and the reference image is provided to the representative image selection unit 120 and/or the database 130. For example, a search query corresponding to a textual string of "adult male", "red truck", or "female on bicycle" is input. Each search query falls into at least one query class, such as "person", "vehicle", and the like, and template images which define what an appropriate subject looks like for each query class are stored in the database 130. For example, an appropriate subject for a "person" query may present all body parts of a person, be facing the camera, have lowered arms, be wearing nondescript clothing, and the like. There are also template images which define appropriate subjects for search queries which encompass multiple query classes, such as the aforementioned "female on bicycle". The template images may be based on stock images, for example, and may be stored in the database 130. The stock images may be, for example, search results obtained via an online search engine, or may be based on the results of an earlier, similar search. Additionally, the template images may be altered based on certain modifier keywords, such as colors, sizes and other keywords representative of characteristics. For example, a representative image for the textual string "red truck" may be based on a template image of a truck which is then modified to incorporate the color red.

The search result received based on the search query includes a series of images. The search result images are based on original images stored in the database 130, which may be sequentially-acquired still images forming video tracks. The search result images may include any number of the original images, any number of sequences of the original images, and may include whole original images or only portions or sections thereof. For example, for a given video track showing a person walking along a street, the search result images may include the entire video track, or may include one or more portions thereof. Additionally, the search result images may each be an entire original image of the video track, or may only be a portion of the original image, such as an area surrounding the person.

At step 320, the search result images are optionally modified. For example, the search result images can be rotated, reflected, skewed, color-corrected, and the like. Additionally, the search result images can be expanded and/or cropped based on the original images. Expanded images comprise a greater portion of the original images than is contained in the search result images. To generate expanded images, the database 130 can be accessed to acquire the original images from which the images of the search result are based. Cropped images comprise a lesser portion of the original images than is contained in the search result images. Additionally, expanded and cropped images can include portions of the original images from different regions of the original images, so that expanded and cropped images can include portions of the original images not shown in the search result images.

Figure 4A:
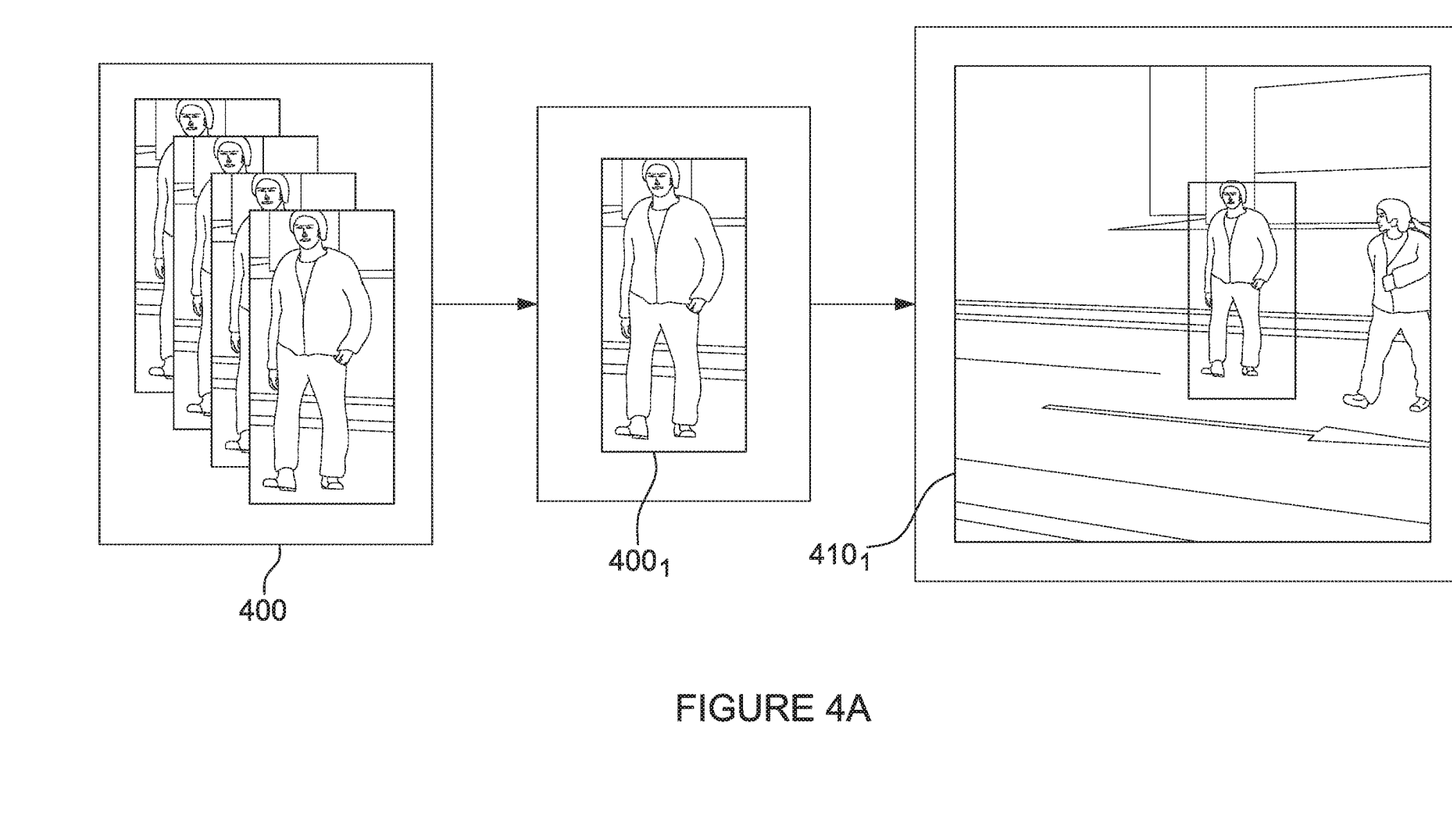
FIGS. 4A and 4B are graphical representations of an example of an image modification process implemented by the computing device.
Figure 4B:
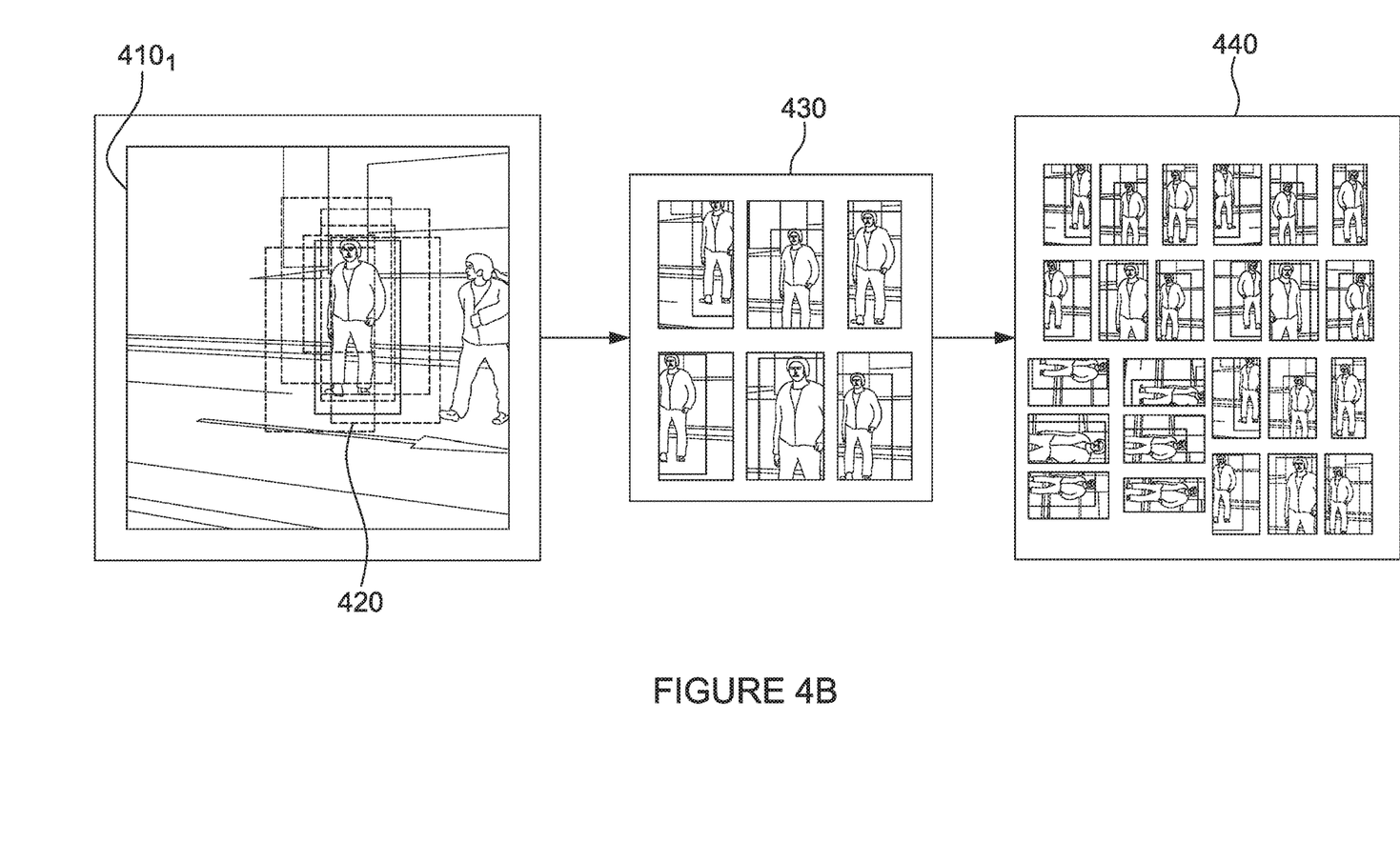

Examples of image modification are illustrated in FIGS. 4A and 4B. Images 400 are example search result images for a given search result. For a given search result image $400_1$, an original image $410_1$ can be obtained, for example from the database 130. Then, a plurality of boxes 420 may be superimposed on the original image $410_1$ to generate a number of expanded and/or cropped modified images 430.

The boxes 420 may be obtained manually, for example via input from an operator, or may be generated automatically. The search result images 400, as well as the modified images 430, can be further modified in other ways, including reflections, rotations, color-corrections, lighting- and shading-correction, and the like, in order to create a larger set of images 440. The larger set of images 440 can also be created by distorting or warping, for example by shrinking or expanding in a single dimension, by rotating only a portion thereof, by skewing the search result images 400 and/or the modified images 430, and the like. Any other suitable image modification technique may be used in order to clarify the potential similarity between the search result images 400 and the search query.

In some embodiments, the particular modification steps are selected on the basis of the search query. The search query may be used as a guide to narrow down all the various modification steps to a subset of modification steps which are more likely to generate images with higher similarity to the query. For example, if the search query comprises a visual of interest largely composed of a single color, step 320 excludes color-correction from the image modification steps, and instead focuses on expanding, cropping, rotating, reflecting, and skewing modification steps. In some embodiments, the particular modification steps may be selected on the basis of the source used to acquire the search result images. The type of source, the lighting conditions, the relative location in situations of multiple sources, and the like, may be used to narrow down all the various modification steps to a subset of modification steps which are more likely to generate images with higher similarity to the query. For example, if the search result images are images from security cameras in a low-light environment, shadow-correction techniques are first used to modify the search result images. In some embodiments, the use of the search query and/or the source of the search result images to select the particular modification steps are based on machine learning. Statistics may be kept about the rate at which each of the particular modification steps leads to images having a high similarity score with the search query. Based on these statistics, certain modification steps may be prioritized over others, or prioritized based on certain characteristics of the search query and/or the source of the images.

Referring back to FIG. 3, at step 330, a similarity score is computed for at least some images of the plurality of search result images. These images are taken from the set of search result images 400, the set of modified images 430, or the larger set of images 440. The similarity score is computed based on a similarity between each image and the search query. This similarity is computed using any suitable algorithm, such as edge detection, a combining scaling algorithm, a structural similarity algorithm, or any other suitable algorithm or combination of algorithms. The similarity score is represented in any suitable way, such as a decimal value between 0 and 1, a percent score between 0% and 100%, a letter grade ranging from A to F, and the like. In some embodiments, the similarity score is an absolute similarity score based on the similarity of the image to the search query. In some other embodiments, the similarity score is relative, such that the images are ranked relative to one another in terms of similarity. In some other embodiments, the similarity score is a combination of absolute and relative scores.

In some embodiments, if the similarity scores computed at step 330 are below a given threshold, the method 300 performs, or re-performs, step 320 to generate additional images for which similarity scores may be computed, and re-performs step 330 on the additional images. For example, if the similarity score is represented as a value between 0 and 1, a threshold may be set at 0.65. If no computed similarity score is above the threshold of 0.65, the method 300 then performs step 320 to generate additional images, and thereafter performs step 330 on the additional images. In some cases, step 320 is performed prior to step 330 and no similarity score is above the threshold. As a result, step 320 is re-performed using image modification steps different from those used in the first implementation of step 320. Additionally, steps 320 and 330 may be repeated iteratively any suitable number of times, or until at least one similarity score surpasses the threshold.

At step 340, at least one of the images is selected on the basis of the similarity score. The selected image can be the image with the highest or best similarity score. In some embodiments, multiple images are selected, for example if multiple images have identical similarity scores, or any image with a score greater than a predetermined threshold. In some embodiments, a predetermined number of images are selected, or a predetermined number of images having the highest or best similarity score are selected. Other embodiments for selecting images based on the similarity score may be used.

At step 350, the at least one selected image is assigned as the representative image of the search result. The assignment is effected, for example, by assigning a common search result identifier to both the search result and the representative image, or in any other suitable fashion. In some situations, more than one image is selected at step 340, and the searching system 100 assigns all of the selected images as the representative image of the search result.

At step 360, the method optionally includes presenting a search result listing 200 of the search results, as shown in the example of FIG. 2. The search result listing 200 includes the representative image for each one of the entries 210. In some embodiments, when multiple entries 210 are presented in the search result listing 200, the entries 210 are ordered based at least in part on the similarity score of the at least one representative image. For example, the top entry 210A may be the search result for which the assigned representative image had the highest or best similarity score. In some situations, each search result is assigned a plurality of representative images, and the search result listing 200 orders the entries 210 based on an average similarity score, on a median similarity score, or on any other suitable metric. In some embodiments, the entries 210 are ordered based on a composite score that is derived from a linear or non-linear combination (e.g. a weighted sum) of the similarity score of the representative image(s) and any numerical factors that are used (or calculated) by the search unit 110 in order to return the initial set of search results. Therefore, the similarity with the representative image may be used as a factor in ordering the search results.

In some embodiments, it is possible to cycle through the representative images. For example, the representative images automatically cycle periodically, such as every few seconds or every few minutes. In some other embodiments, positioning a pointing device of the computing device in a hovering position over the representative image of an entry 210 causes the entry 210 to cycle through the representative images assigned thereto. In some embodiments, interacting with a particular entry 210 causes the computing device to begin playback of the video track associated with the particular entry 210. In some embodiments, the playback begins from the image of the video track from which the representative image of the entry 210 was taken. In other embodiments, the playback begins from a beginning of the video track.

The video track may also be divided into a plurality of segments. Each segment can be of a predetermined length, for example five, ten, twenty, thirty, sixty, or any other suitable number of milliseconds, seconds, or minutes, or may be of a variable length, which can be established, for example, based on the contents of the video track, the presence or absence of the visual of interest, and the like. In some embodiments, playback is performed only with certain more relevant segments of the video track, and segments of the video track that are less relevant are removed. Thus, when playing the video track associated with a given entry 210, rather than playing the whole video track, only certain segments are played. In some embodiments, the segments are started from, centered at, or ended at, the image from which the representative image of the entry 210 is taken. For example, a thirty-second segment starting from the image from which the representative image of the entry 210 is taken is played. As another example, a ten-second segment centered at the image from which the representative image of the entry 210 is taken is played. In some embodiments, multiple representative images are assigned, and multiple video segments are played one after the other. In other embodiments, only images from the video track of the search result having a similarity score higher than a given threshold are played. In other embodiments, only segments of the video track of the search result having at least a predetermined number of images having a similarity score higher than a given threshold are played. For example, a video track of a search result can be broken up into ten second segments. Each such segment contains a given number of images, based on the frame rate of the video track. For the video segment to be played, at least 10%, 25%, 50%, or any other suitable percentage of the images may need to have a similarity score higher than a given threshold. Other methods for selecting segments of a video track for playback are also considered With reference to FIG. 5, the representative image selection unit 120 is implemented by any suitable computing device 500. The computing device 500 comprises any suitable type of processor 520, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The computing device 500 also comprises any suitable type of computer memory 510, the computer memory 510 being located internally or externally. For example, the computing device 500 includes random-access memory (RAM), read-only memory (ROM), optical-disc-based read-only memory, electro-optical memory, magneto-optical memory, erasable programmable read-only memory (EPROM), electrically-erasable programmable read-only memory (EEPROM), Ferroelectric RAM (FRAM), and the like. The computing device 500 comprises a network interface (not pictured) in order to communicate with other components, to access and connect to network resources, and to perform other computing applications by connecting to one or more networks capable of carrying data.

Figure 5:
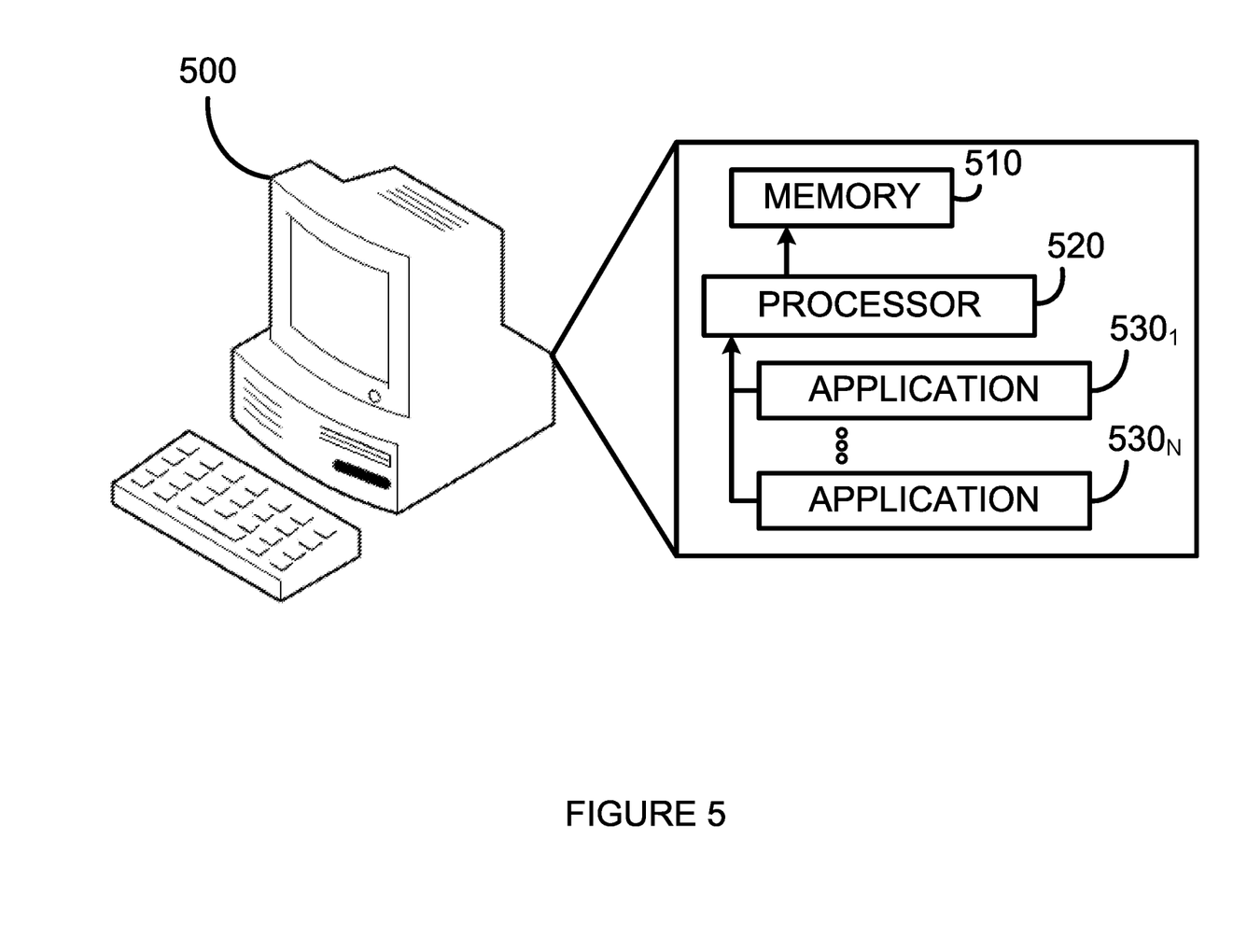
FIG. 5 is a block diagram of an example of the computing device.
Figure 6:
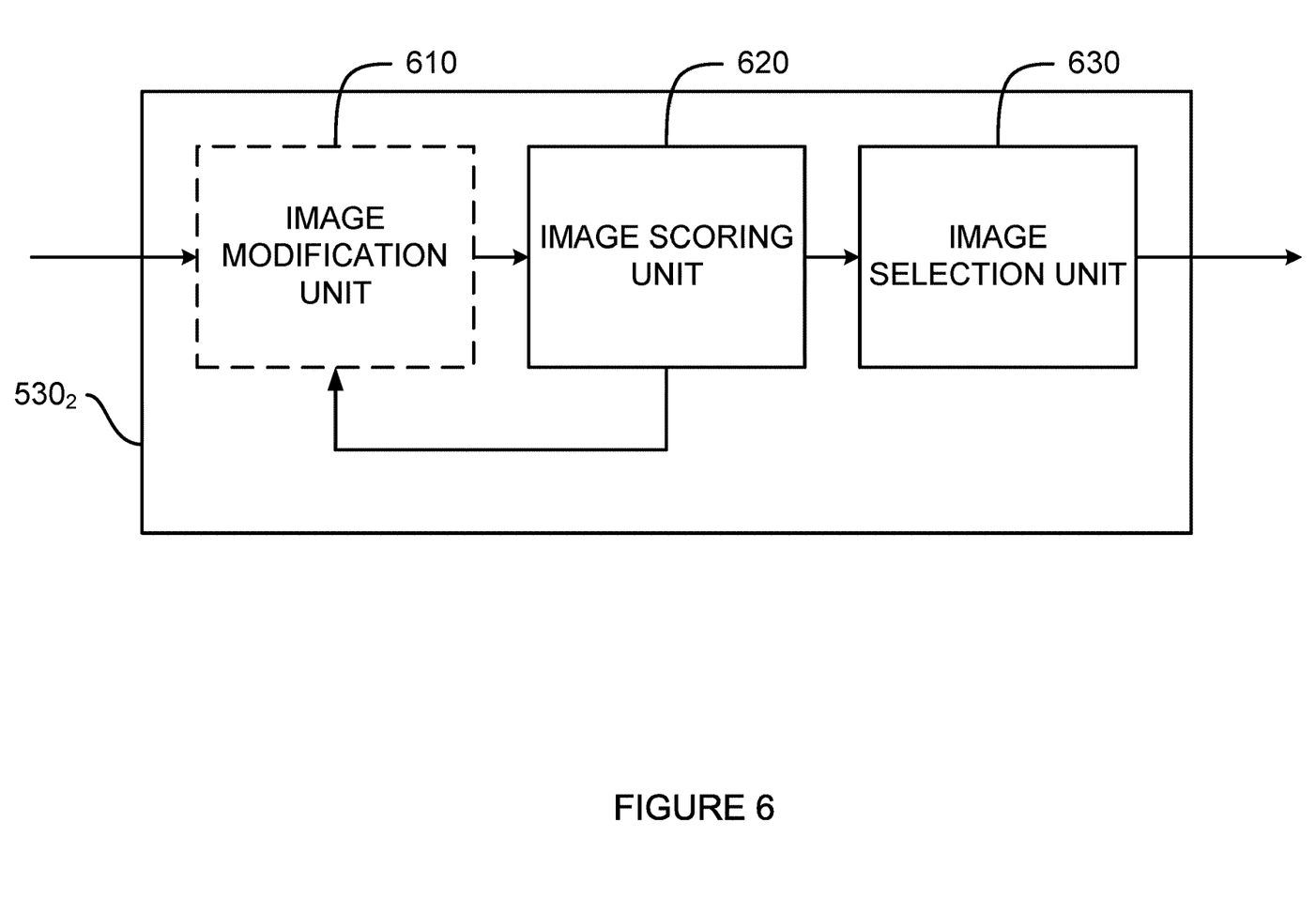
FIG. 6 is a block diagram of an example of an application implemented by the computing device.

The computing device 500 is configured to run or execute any number of applications $530_1$-$530_N$. The applications $530_1$-$530_N$ are stored in the memory 510, and are executed on the processor 520. One such application, for example application $530_1$, implements the searching system 100. In some embodiments, the search unit 110 is embodied by a first application 530₁ and the representative image selection unit 120 is embodied by a second application 530₂, as illustrated in FIG. 6. In some embodiments, multiple applications are used to implement each one of the search unit 110 and/or the representative image selection unit 120.

With reference to FIG. 6, the application 530₂ implements the representative image selection unit 120, including an image score determination unit 620 and an image selection unit 630. Optionally, the representative image selection unit 120 includes an image modification unit 610. The image modification unit 610 is configured for receiving the series of search result images and for implementing step 320 of the method 300 to generate modified images. The image modification unit 610 comprises sufficient processing means for implementing the image modification steps described hereinabove. Alternatively, the image modification unit 610 is configured for managing modification of the search result images as performed by another unit. The other unit can be part of the representative image selection unit 120 or external thereto, including external to the search unit 110. The other unit can be accessed remotely, through a network using wired or wireless communications. Modified images are then transmitted from the image modification unit 610 to the image scoring unit 620 for computation of similarity scores for each of the images.

The image scoring unit 620 is configured for receiving the search result images 410 and, if applicable, the modified images 430, from the image modification module 610 or directly from the search unit 110, and for implementing step 330 of the method 300 to compute similarity scores for each of the images. The similarity scores computed by the image scoring unit 330 may be a value ranging from 0 to 1, a percentage ranging from 0% to 100%, a letter grade, or any other suitable similarity score, as described hereinabove. The image scoring unit 620 then associates each image with a respective similarity score, for example by storing the respective similarity score in the memory 510 in association with the image. Once the similarity scores have been computed, the image scoring unit 620 provides the images and the similarity scores to the image selection unit 630.

In some embodiments, the image scoring unit 620 has a threshold value for the similarity scores, such that if none of the images have a similarity score surpassing the threshold value, the images and similarity scores are not provided to the image selection unit 630. Instead, the image scoring unit 620 is configured for providing, or re-providing, the images to the image modification unit 610. The image modification unit 610 then modifies the images, or causes the images to be modified, and returns the modified images to the image scoring unit 620. If the image modification unit 610 had already previously provided modified images to the image scoring unit 620, the image modification unit 610 uses image modification techniques different from the image modification techniques used to generate the previously provided modified images. Alternatively, the image modification unit attempts to improve the previously provided images by varying parameters of the image modification techniques used. The image scoring unit 620 and the image modification unit 610 may repeat this process iteratively any suitable number of times, or until at least one similarity score surpasses the threshold.

The image selection unit 630 is configured for receiving the images and the respective similarity scores from the image score determination unit 620, or for retrieving the images and the respective similarity scores from the memory 510, and for implementing steps 340 and 350 of the method 300. The image selection unit 630 selects one or more images to be the representative images of the search result on the basis of the similarity score. The image selection unit 630 may be provided with selection criteria, such as a number of representative images to select, or instructions on how to select one or more representative images when a number of images have equivalent similarity scores. Once the representative images have been selected, the representative images are assigned to a corresponding search result as a representative image.

In some embodiments, the search results are output from the representative image selection unit 120 instead of the search unit 110. The representative image selection unit 120 may thus be configured for preparing the search result listing 200, as described hereinabove.

In some embodiments, determining a similarity score is done on the basis of a similarity function trained using machine learning. For example, the similarity function is presented a training set of pairs of search queries and search results, and is then presented appropriate representative images for each pair. The similarity function then applies machine learning principles and algorithms to learn what characteristics make for an appropriate representative image. Once trained, the similarity function is used to compute similarity scores for the images.

In some embodiments, the representative image selected by the image selection unit 630 at step 340 of the method 300 is an image resulting from the image modification performed by the image modification unit 610. Therefore, the representative image can be an expanded, cropped, rotated, reflected, skewed, color-corrected, or otherwise modified version of an image of the search result. Accordingly, when presented in the search result listing 200, the representative image associated with the search result may not correspond to any of the search result images. In some other embodiments, although the image having the highest or best similarity score is an image resulting from the image modification performed by the image modification unit 610, the image selection unit 630 selects the image from which the modified image was generated. Accordingly, when presented in the search result listing 200, the representative image associated with the search result is an original version of the image having the highest similarity score. In some embodiments the search result listing 200 cycles through the representative images, and the first representative image in the cycle is the original version of the image, and the following representative image in the cycle is the modified version of the image, or vice versa. Alternatively, the first representative image is a substantively unadulterated version of the original image, for example, an expanded, cropped, or displaced version, followed by a more heavily modified version, which may be color corrected, reflected, skewed, and the like, or vice versa. In some cases, multiple representative images are assigned, and the sequence of representative image in the cycle follows an "original-modified" or "unadulterated-modified" pattern, or vice versa.

As discussed hereinabove, the search result listing 200 presents search results 210 with respectively associated representative images which are based on the search query provided in the search request. Accordingly, the representative images are selected as a function of the search query. This means that two different search queries having a common visual of interest can result in the searching system 100 selecting different representative images for each associated search result 210. For example, for two search queries submitted for a same person, with one search query showing the person with arms outstretched and the other with arms crossed, the search result 210 for the first search query is associated with a representative image showing the person with outstretched arms, and the second search query is associated with a representative image showing the person with crossed arms, even though the search results 210 are associated with a common video track.

Each computer program described herein may be implemented in a high level procedural or object oriented programming or scripting language, or a combination thereof, to communicate with a computer system. Alternatively, the programs may be implemented in assembly or machine language. The language may be a compiled or interpreted language. Each such computer program may be stored on a storage media or a device, for example a ROM, a magnetic disk, an optical disc, a flash drive, or any other suitable storage media or device. The computer program may be readable by a general or special-purpose programmable computer for configuring and operating the computer when the storage media or device is read by the computer to perform the procedures described herein. Embodiments of the system may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the present searching system 100 may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The appended claims are to encompass within their scope all such changes and modifications.

What is claimed is:

1. A computer-implemented method comprising:
receiving, at a computing device, a search result based on a search query, the search result comprising a plurality of images, the search query comprising an image;
computing, at the computing device, a similarity score for each respective image of a set of images based on a similarity between the respective image and the search query, the set of images comprising at least some images of the plurality of images of the search result;
comparing, at the computing device, the similarity score for the each respective image to a threshold;
modifying, at the computing device, one or more images of the set of images when the similarity score for the each respective image of the set of images is below the threshold, wherein the modifying the one or more images comprises:
selecting a subset of image modification operations from a set of image modification operations of expanding, cropping, rotating, inverting, and color-correcting based on the search query, a number of operations in the subset of image modification operations being less than a number of operations in the set of image modification operations; and
generating, for the each respective image of the one or more images, one or more modified images by performing the selected subset of image modification operations on the respective image until at least one of the one or more modified images has a corresponding similarity score greater than the threshold, the at least one of the modified images having a higher similarity to the image of the search query than the one or more images of the set of images;
selecting, at the computing device, at least one representative image of the search result from the modified images that have corresponding similarity scores greater than the threshold; and
sending, by the computing device, a search result listing for presentation on a display device, the search result listing comprising the at least one representative image of the search result.

2. The computer-implemented method of claim 1, further comprising presenting the search result listing and the at least one representative image on the display device of the computing device.

3. The computer-implemented method of claim 2, further comprising:
receiving, at the computing device, a second search result based on the search query, the second search result comprising a second plurality of images;
computing, at the computing device, a similarity score for each respective image of a second set of images based on a second similarity between the respective image of the second set of images and the search query, the second set of images comprising at least some of the second plurality of images of the second search result;
selecting at least one representative image of the second search result from the second set of images based on the similarity score; and
presenting in the search result listing the search result and the second search result at least partly based on the similarity score of the at least one representative image of the search result and the second search result.

4. The computer-implemented method of claim 2, wherein selecting the at least one representative image comprises selecting a plurality of representative images of the search result and presenting comprises cycling through each of the plurality of representative images of the search result.

5. The computer-implemented method of claim 2, wherein receiving the search result comprises receiving a video track consisting of the plurality of images, and wherein presenting the search result listing comprises, in response to receiving an input indicative of an interaction with the search result, causing playback of the video track associated with the search result starting from the at least one representative image.

6. A system comprising:
a processing unit; and
a memory, communicatively coupled to the processing unit and comprising computer-readable program instructions executable by the processing unit for:
receiving a search result based on a search query, the search result comprising a plurality of images, the search query comprising an image;
computing a similarity score for each respective image of a set of images based on a similarity between the respective image and the search query, the set of images comprising at least some of the plurality of images of the search result;
comparing the similarity score for the each respective image to a threshold;
modifying one or more images of the set of images when the similarity score for the each respective image of the set of images is below the threshold, wherein the modifying the one or more images comprises:
selecting a subset of image modification operations from a set of image modification operations of expanding, cropping, rotating, inverting, and color-correcting based on the search query, a number of operations in the subset of image modification operations being less than a number of operations in the set of image modification operations; and
generating, for the each respective image of the one or more images, one or more modified images by performing the selected subset of image modification operations on the respective image until at least one of the modified images has a corresponding similarity score greater than the threshold, the at least one of the modified images having a higher similarity to the image of the search query than the one or more images of the set of images;
selecting at least one representative image of the search result from the modified images that have corresponding similarity scores greater than the threshold; and
sending a search result listing for presentation on a display device, the search result listing comprising the at least one representative image of the search result.

7. The system of claim 6, the computer-readable program instructions being further executable by the processing unit for presenting the search result listing and the at least one representative image on the display device of the system.

8. The system of claim 7, wherein the computer-readable program instructions are further executable by the processing unit for:
receiving a second search result based on the search query, the second search result comprising a second plurality of images;
computing a similarity score for each respective image of a second set of images based on a second similarity between the respective image of the second set of images and the search query the second set of images comprising at least some of the second plurality of images of the second search result;
selecting at least one representative image of the second search result from the second set of images based on the similarity score; and
presenting in the search result listing the search result and the second search result at least partly based on the similarity score of the at least one representative image of the search result and the second search result.

9. The system of claim 7, wherein selecting the at least one representative image comprises selecting a plurality of representative images of the search result, and presenting comprises cycling through each of the plurality of representative images of the search result.

10. The system of claim 7, wherein receiving the search result comprises receiving a video track consisting of the plurality of images, and wherein presenting the search result listing comprises, in response to receiving an input indicative of an interaction the search result, causing playback of the video track associated with the search result starting from the at least one representative image.

11. The method of claim 1, wherein the search query further comprises at least one of a date, a time, a search resolution, and a search frame rate.

12. The method of claim 1, further comprising:
receiving, at the computing device, a search request comprising the search query; and
searching, by the computing device, a database comprising images using a search algorithm and the search query to obtain the search result.

13. The method of claim 12, wherein the search algorithm includes performing feature extraction on the images of the database and the image of the search query.

14. The system of claim 6, wherein the search query further comprises at least one of a date, a time, a search resolution, and a search frame rate.

15. The system of claim 6, wherein the memory further comprises computer-readable program instructions executable by the processing unit for:
receiving a search request comprising the search query; and
searching a database comprising images using a search algorithm and the search query to obtain the search result.

16. The system of claim 15, wherein the search algorithm includes performing feature extraction on the images of the database and the image of the search query.

17. The method of claim 1, the selecting further comprises selecting the subset of image modification operations based on source information used to acquire the search result, the source information including a source type, source lighting conditions, and relative locations of multiple sources.

18. The method of claim 1, further comprising:
determining that each of the modified one or more images has a corresponding similarity score less than the threshold; and
selecting a second subset of image modification operations from the set of image modification operations based on the search query, the second subset of image modification operations being different from the subset of image modification operations, and a number of operations in the second subset of image modification operations being less than the number of operations in the set of image modification operations.

19. The method of claim 1, wherein the at least one representative image of the search result is ordered based on a weighted sum of similarity scores of the at least of presentative image.

* * * * *